United States Patent [19]

Cronch et al.

[11] Patent Number: 5,105,316

[45] Date of Patent: Apr. 14, 1992

[54] QUALIFICATION FOR PULSE DETECTING IN A MAGNETIC MEDIA DATA STORAGE SYSTEM

[75] Inventors: Robert D. Cronch, Oklahoma City, Okla.; Larry J. Koudele, Louisville, Colo.

[73] Assignee: Seagate Technology, Inc., Scotts Valley, Calif.

[21] Appl. No.: 439,559

[22] Filed: Nov. 20, 1989

[51] Int. Cl.$^5$ ............................ G11B 5/09; G11B 5/035
[52] U.S. Cl. ........................................ 360/46; 360/65
[58] Field of Search ............................ 360/46, 65

[56] References Cited

U.S. PATENT DOCUMENTS

| | | | |
|---|---|---|---|
| 3,585,507 | 6/1971 | Bickel | 328/116 |
| 3,822,399 | 7/1974 | Grund et al. | 324/103 P |
| 3,846,692 | 11/1974 | Hill | 321/8 R |
| 3,882,489 | 5/1975 | Guggolz et al. | 340/347 |
| 3,921,010 | 11/1975 | Griffin | 307/235 A |
| 4,311,960 | 1/1982 | Barr | 324/103 P |
| 4,370,620 | 1/1983 | Tin | 329/192 |
| 4,626,933 | 12/1986 | Bueska et al. | 360/51 |
| 4,634,895 | 1/1987 | Luong | 307/350 |
| 4,634,896 | 1/1987 | Sprinkle | 307/351 |
| 4,686,389 | 8/1987 | Seifert | 307/351 |

*Primary Examiner*—John H. Wolff
*Assistant Examiner*—Won Tae C. Kim
*Attorney, Agent, or Firm*—Kinney & Lange

[57] ABSTRACT

A raw data signal, of the type generated from magnetic storage systems, is qualified by detecting the highest peak after the raw data signal passes qualification thresholds. This peak is used to indicate the true data pulse location. The location of the highest peak after the raw data signal has passed a minimum qualification threshold may be detected using a transistor circuit for charging a capacitor connected to a comparator or through a tri-level qualification scheme. Using tri-level qualification, a set of comparators and flip flops are used to locate raw data signal peaks.

10 Claims, 5 Drawing Sheets

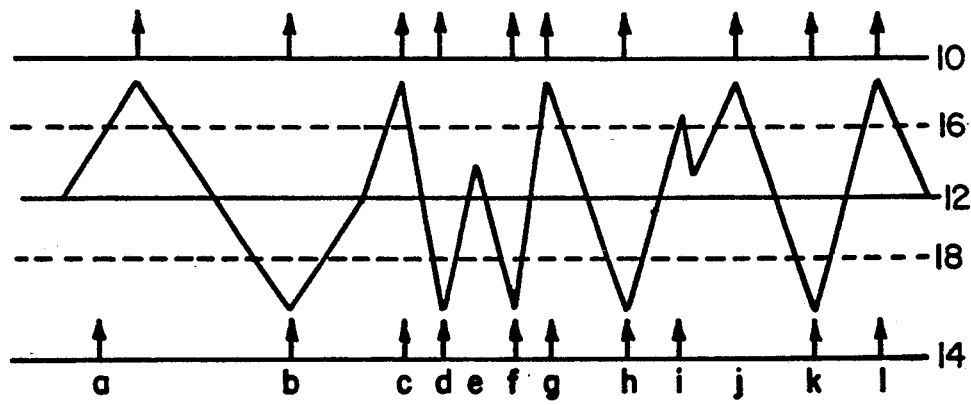
Fig. 1 PRIOR ART
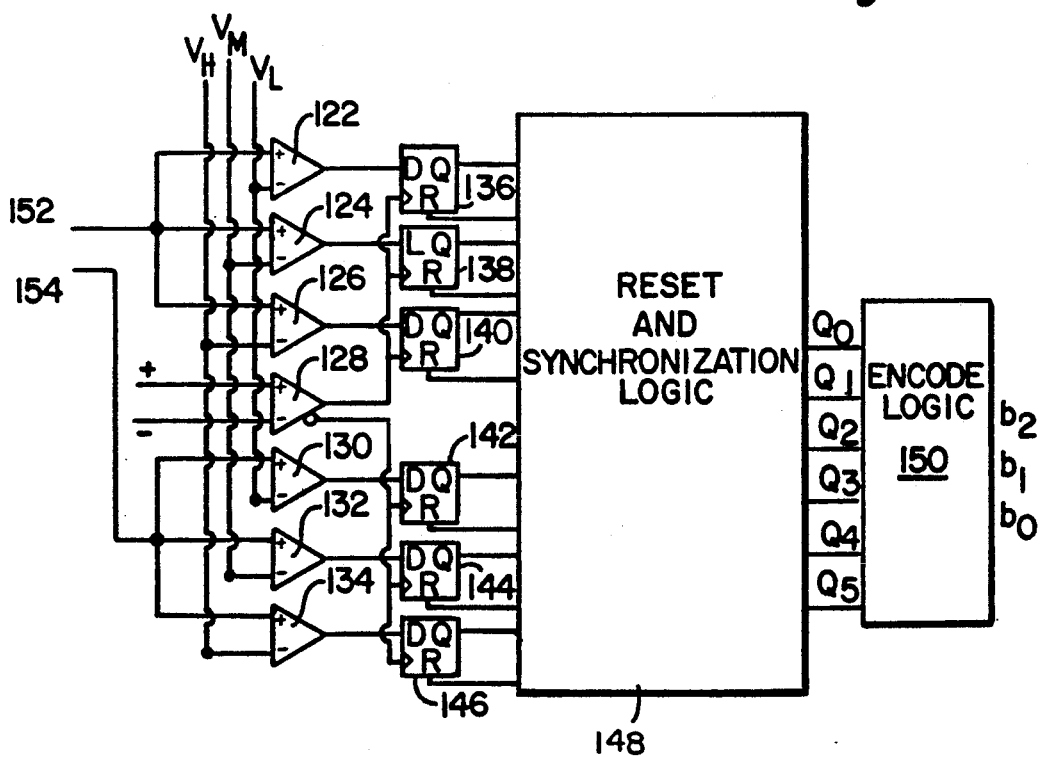
Fig. 7
Fig. 8

QUALIFICATION FOR PULSE DETECTING IN A MAGNETIC MEDIA DATA STORAGE SYSTEM

BACKGROUND OF THE INVENTION

1. Field of the Invention

The present invention relates to qualifying valid data read from a magnetic tape or disk system. More particularly, the present invention relates to qualifying valid data peaks occurring in a raw output signal of the type produced by a magnetic head used in a magnetic tape or disk drive storage device.

2. Description of the Prior Art

In a magnetic storage system such as a computer disk drive, digital information is magnetically stored at the surface of the disk. Digital information is represented by selectively polarizing consecutive areas across the surface of the rotating magnetic disk. When this information is read back from the storage disk, the magnetic polarization of the medium is sensed and converted into an electrical output signal: i.e. the raw data signal. The raw data signal is representative of the relative strength of the magnetic flux density present on the magnetic disk. This reading and writing operation is accomplished through a magnetic read/write head.

It is highly desirable to provide high levels of information storage densities on the magnetic disk.

One design criteria in a recording system is to provide an areal density as high as possible for the recording surface without compromising the performance of the system. Unfortunately, increased storage densities lead to significant noise levels in the raw data output signal. The source of this noise signal may include irregularities in the disk surface and the electromagnetic noise associated with proximate electrical devices. Furthermore, high density data coding schemes, such as the 1, 7 code, may further increase the susceptibility of the raw data output signal to unwanted noise. The 1, 7 code employs a single zero magnetic flux cell between any two adjacent flux cells and no more than seven adjacent flux cells. Codes that employ wide "windows" in order to increase disk capacity have larger band widths and longer baselines leading to noise and crosstalk susceptibility. This noise problem may be further exacerbated if the magnetic read head drifts slightly off track.

Data coding schemes which are intended to increase disk capacity and which have a minimum pulse separation of one provide reduced amplitude levels in closely spaced pulses due to inter-symbol interference. This decreases the signal-to-noise ratio, which forces the pulse qualification level to be lowered, and further adds to the off track noise problem.

Simple pulse qualification, in which the first peak over a threshold is taken to be the location of the data "pulse", is no longer adequate. The qualification level typically has been set so that there are an equal number of "dropouts" and an equal number of "extra" pulses due to the noise present in the raw data output signal. Coding schemes directed toward increased data densities, however, can be expected to have significantly more occasions where there are multiple peaks occurring above the lowered qualification threshold and/or peaks located in the long baseline between widely separated pulses. Threshold detectors used to disqualify data peaks whose amplitude does not exceed a prescribed level are not adequate to disqualify false data peaks when the ratio between the signal level and the noise level is small. A "first peak" qualification can be expected to place many pulse locations outside of the proper window. Not only does this cause data decoding problems, it also causes the phase lock loop used in the read back circuitry to "jitter."

SUMMARY OF THE INVENTION

The present invention is used to provide improved qualification of the data peak signals produced by a magnetic read/write head during the read operation. The invention is of particular use with coding schemes having large bandwidths and long baselines, such as in a high density coding scheme. The present invention improves the qualification of the data signal by reducing susceptibility to noise and to cross talk which may particularly be a problem if the magnetic read head is slightly off track.

The invention includes using the first highest peak in the raw data signal after the data signal has passed a certain minimum qualification threshold. The minimum qualification threshold is lowered to avoid most dropouts (due to the reduced amplitude signal provided in high density code schemes such as the 1, 7 code). Problems associated with the increased number of "extra" pulses are eliminated by recognizing only the highest peak. The highest peak will generally occur within the proper window.

The highest peak in the raw data output signal is located using a peak detector. The peak detector, for example, may comprise a transistor for charging a capacitor followed by a comparator. The capacitor voltage charges to the highest peak level through the transistor and is reset at the start of the next window. Logic is then provided to determine when the highest peak has been found and to output the corresponding data pulse. This logic introduces a delay into the circuitry, and to keep the phase lock loop in synchronization, only pulses occurring over a higher threshold level are sent to the phase lock loop phase detector. This may result in a number of dropouts in relation to the phase lock loop. Phase lock loops, however, are inherently less susceptible to dropouts than to wrongly located pulses. A reduced threshold level may be used in the data pulse qualification circuitry.

The location of the first highest peak in the raw data output signal may also be determined using a tri-level qualification scheme. Each peak in the raw data signal triggers a set of flip flops whose inputs are tied to a set of comparators, each having a corresponding qualification level to produce a total of three thresholds. By the pattern of flip flop settings, logic can determine where the data peaks occurred, their relative level and the location of the true peak in the raw data signal based upon the location of the first highest peak.

BRIEF DESCRIPTION OF THE DRAWINGS

FIG. 1 is a graphic illustration of the relationship between the encoding pulse data signal, the raw data output signal and the qualified data pulse output signal in a system using a first peak threshold qualification method.

FIG. 7 is an example of a bit pattern in the shift register of FIG. 5.

FIG. 8 shows a block logic diagram of tri-level qualification circuitry for use in the present invention.

DETAILED DESCRIPTION OF THE DRAWINGS

Figure 2:
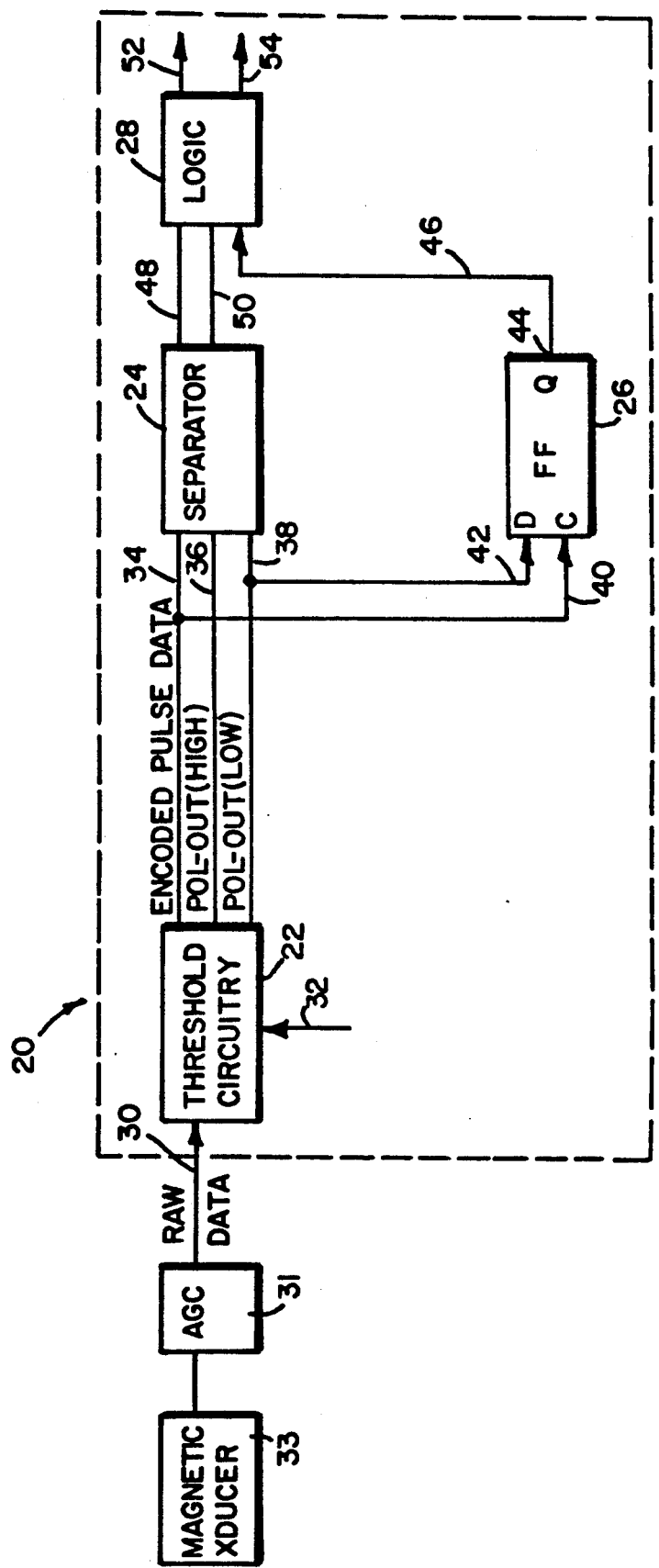
FIG. 2 is a block diagram of qualification circuitry for use in the present invention.

FIG. 1 graphically shows an encoding pulse data signal 10, the corresponding raw data signal 12 and a qualified output signal 14 in which the qualification is based upon detection of the first peak of a given polarity above a qualification level. The dashed lines shown as 16 and 18 in graph 12 represent the positive and negative voltage threshold levels used to qualify raw data signal 12.

FIG. 1 illustrates problems associated with the prior art first peak threshold qualification method. Shown in graph 14 of FIG. 1 are twelve points labelled a–l, each associated with a different point in time along graph 14. Points e, i and j are of particular interest. Point e shows what is referred to as a "dropout" in which the raw data signal produced from the information stored on the magnetic storage medium is too weak to reach the threshold levels (16 and 18) and trigger output signal 14. Thus a data pulse has been lost which should have occurred at point e on graph 14 of FIG. 1. This dropout may, for example, be due to an irregularity in the surface of the storage medium.

The point labelled i on graph 12 of FIG. 1 shows the occurrence of an extra pulse. This extra pulse is shown extending above upper threshold limit 16 in graph 12. The first peak qualification scheme demonstrated in FIG. 1 mistakenly identifies this first pulse as the location of the true data pulse. The correct location of the data pulse is shown at point j in FIG. 1.

Using the present invention, the qualification level used in qualifying the raw data signal may be lowered such that dropouts (see point e in FIG. 1) are less likely to occur. Furthermore, the present invention is not falsely triggered by an extra pulse such as point i in FIG. 1.

FIG. 2 shows a block diagram 20 of one embodiment of the present invention, which includes threshold circuitry 22, separator 24, flip flop 26, and logic 28. Threshold circuitry 22 preferably includes a pulse detector, a low level gate and polarity detector circuitry (not shown). Separator 24 includes a phase lock loop (not shown) for circuit timing. Logic 28 includes shift registers (not shown) for identifying the location of the highest peak, as explained below in more detail. Flip flop 26 preferably is a D-type flip flop.

Threshold detector 22 receives the raw data signal over line 30 from Automated Gain Control stage 31, which acts on the signal developed by a magnetic transducer 33. Threshold detector 22 also receives a threshold voltage reference on voltage threshold reference line 32. Threshold circuitry 22 provides three outputs, encoded pulse data on line 34, polarity out (high) on line 36 and polarity out (low) on line 38, each received by separator 24. Flip flop 26 is connected to encoded pulse data line 34 at its clock input 40 and polarity out (low) line 38 at its D input 42. Flip flop 26 provides Q output 44 connected to clock polarity line 46. Separator 24 provides sync pulse line 48 and read clock line 50 connected to logic 28. Logic 28 also receives clocked polarity line 46 from Q output 44 of flip flop 26. Logic 28 provides gated sync pulse data line 52 and clock line 54.

Figure 3:
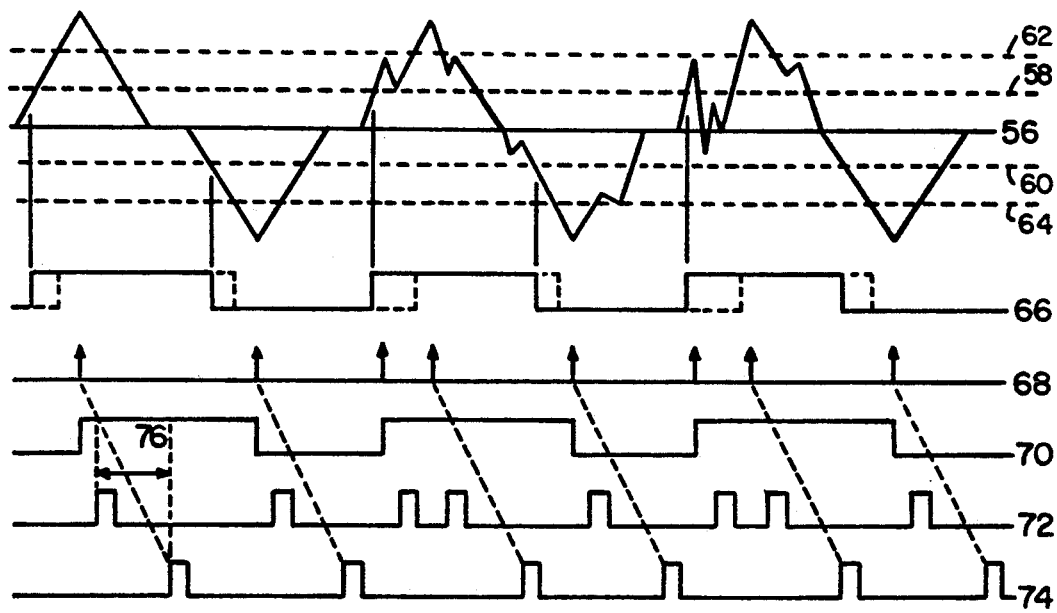
FIG. 3 graphically shows the relationship between volt age and time at various locations in the circuit of FIG. 2.

FIG. 3 shows the logic timing diagram of block diagram 20 during operation. Graph 56 shows the raw data signal carried on line 30 of FIG. 2. Positive and negative low voltage threshold levels are shown by dashed lines 58 and 60, respectively in graph 56 of FIG. 3. Positive high voltage threshold and negative high voltage threshold are shown by dashed line 62 and 64, respectively in graph 56. These threshold voltage levels are generated from the voltage provided on voltage threshold reference line 32 in FIG. 2. A graph of polarity out (low) is shown by the solid line and a graph of polarity out (high) is shown by the dashed line in graph 66 of FIG. 3. The two polarity out signals are taken from polarity out (high) line and polarity out (low) line 36 and 38, respectively. Graph 68 shows a plot of the encoded pulse data carried on line 34 of FIG. 2 Graph 70 shows the clocked polarity signal from clock polarity line 46 provided by flip flop 26. The sync pulse data taken from sync pulse line 48 is shown in graph 72. The gated sync pulse data provided by logic 28 taken from gated sync pulse data line 52 is shown in graph 74.

The raw data signal provided by line 30 has been amplified through an Automatic Gain Control circuit such that the raw data signal may trigger threshold circuitry 22. The voltage threshold level may be set by adjusting the voltage provided to threshold circuitry 22 by voltage threshold reference line 32. Varying the voltage on reference line 32 correspondingly varies threshold levels 58–64 shown on plot 56. Two polarity signals are shown in graph 66, the solid line is generated using the positive and negative low voltage thresholds 58 and 60 and the dashed line is generated using the positive and negative high voltage thresholds 62 and 64. Encoded data signal shown in plot 68 is generated by threshold circuitry 22 using standard dV/dt and zero cross detection such that only signals having the proper polarity of zero cross detection can cause an encoded data pulse on line 34. Furthermore, a method of peak detection is employed that allows only peaks of monotonically increasing amplitude to generate the encoded pulse data of graph 68. This monotonically increasing peak detection occurs within any given constant polarity interval.

The encoded pulse data and polarity information is sent to a standard phase lock loop and data separator in separator 24 and followed by shift registers and gating logic in 28. This circuitry removes all but the last sync pulse in any constant polarity interval.

Since only monotonically increasing pulses within a data window are represented on encoded pulse data line 34, by providing gated sync pulses on gated sync pulse data line 52 corresponding to only the last pulse on encoded pulse data line 34 within a pulse polarity window, only with the highest level occurring within that window will be represented on gate sync pulse line 34.

Only encoded pulse data in which both the polarity out (high) line 36 and polarity out (low) line 38 are in the same high or low state is used by the phase lock loop as phase detector information. This eliminates bad phase information caused by lower data peaks triggering the encoded pulse data. All encoded pulse data, however, is used by the data separator 24 and re-timed into synchronized pulse data. Shift register 28 introduces a delay shown by time delay 76 in FIG. 3 in the gated sync pulse data shown in graph 74.

Figure 4:
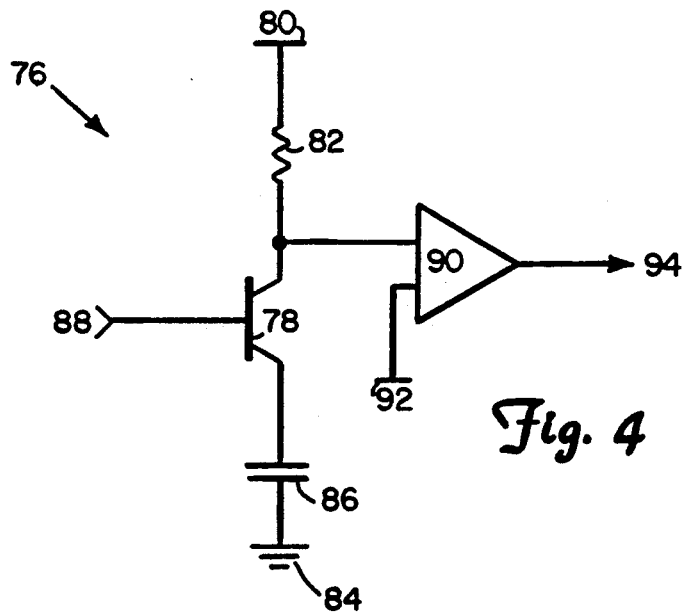
FIG. 4 is a schematic of the peak detector circuitry used in the circuit of FIG. 2.

FIG. 4 shows a schematic diagram of peak detector circuitry 76 including transistor 78 used in threshold circuitry 22 of FIG. 2. The collector of transistor 78 connects to supply voltage 80 through resistor 82. The emitter of transistor 78 connects to electrical ground 84 through capacitor 86. The base of transistor 78 receives the Automatic Gain Controlled raw data signal from input 88. A peak detector 90 is connected to the collector of transistor 78 and to a voltage reference 92 and provides an output 94. Peak detector 90 and transistor circuit 78 are used to detect monotonically increasing peaks in the data signal from input 88.

The raw data signal shown in graph 56 of FIG. 3 contains numerous peaks. Positive voltage threshold 58 and high threshold 62 and negative voltage threshold 60 and low threshold 64 are shown in graph 56 of FIG. 3. Transistor circuit 78 and peak detector 90 operate in combination to produce a data pulse signal having pulses representing only those data peaks in the data signal shown in graph 56 that are monotonically increasing within a given polarity range above or below the corresponding positive or negative threshold voltage 58 or 60. Thus, those peaks not reaching the minimum thresholds levels 58 and 60 do not produce a corresponding data pulse on output 94 of peak detector 90.

Peak detection circuitry 76 includes capacitor 86 which holds a charge indicative of the highest signal value provided on input 88. As the signal input increases, transistor 78 conducts to charge capacitor 86. At a peak, transistor 78 will conduct only if the input signal provided by input 88 has a magnitude exceeding the prior input signal magnitude within a given polarity window in the raw data signal. Thus signal peaks in graph 56 of FIG. 3 which are not as great as the prior peaks will not generate a pulse on output 94 of peak detector 90 shown in graph 68 of FIG. 3. Peak detector circuit 76 is reset upon a polarity window reversal in the raw data signal.

Threshold circuitry 22 provides separator 24 with output 94 comprising encoded pulse data on line 34 along with polarity at high and low signals as lines 36 and 38, respectively.

Figure 5:
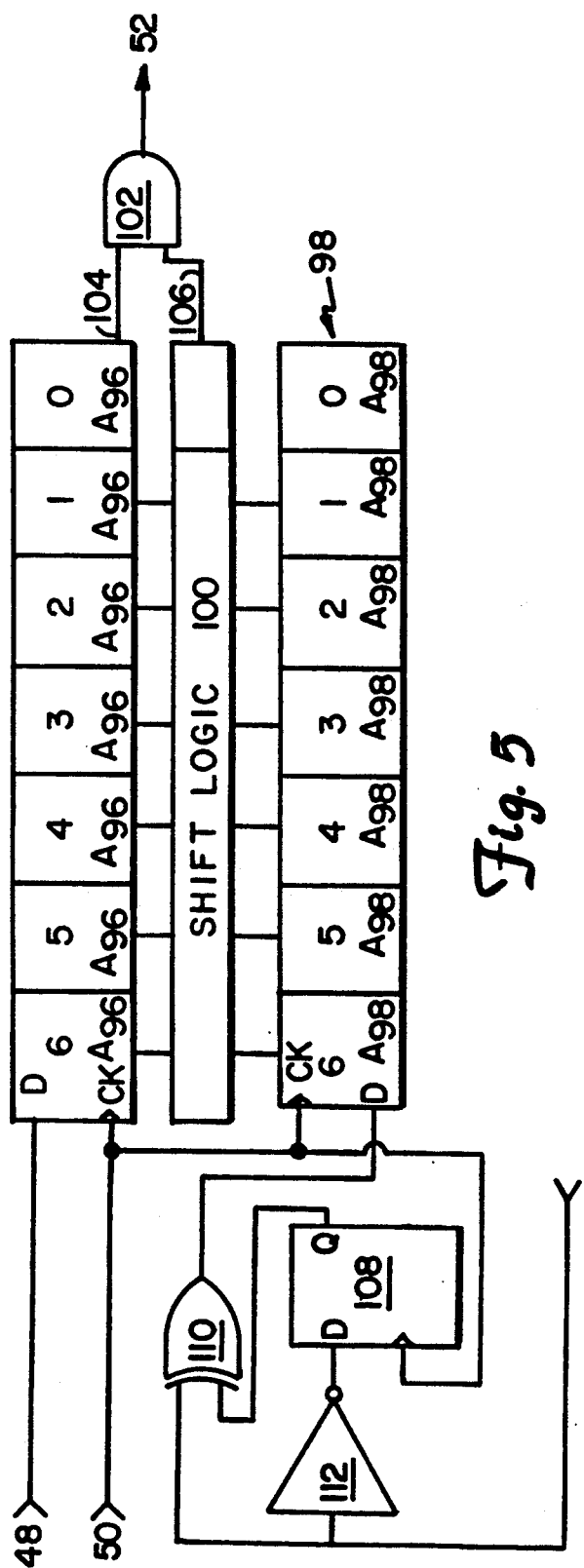
FIG. 5 is a more detailed block diagram of the shift register logic used in the circuit of FIG. 2.

FIG. 5 shows a more detailed logic diagram of logic 28 shown in FIG. 2. Logic 28 includes shift registers 96 and 98 connected to shift logic 100. Shift register 96 is the data shift register and shift register 98 is the polarity shift register. AND gate 102 connects to data shift register 96, shift logic 100 enable output 106. Clock inputs of data shift register 96 and polarity shift register 98 receive clock pulses from read clock line 50. Data is loaded onto data shift register 96 from sync pulse line 48. Data for polarity shift register 98 is generated from the signal on clocked polarity line 46 provided by flip flop 26 using flip flop 108, exclusive OR gate 110 and invertor 112.

Polarity shift register 98 receives binary "1"s for positive and binary "0"s for negative polarities. Similarly, data on sync pulse line 48 of 24 is loaded onto data shift register 96. The two shift registers, 96 and 98 are clocked at the same rate using read clock line 50. The clock rate is derived from a phase lock loop in separator 24. Shift logic 100 operates in conjunction with both data shift register 96 and polarity shift register 98. Shift logic 100 locates the last pulse in the sequence of read pulses provided on sync pulse data line 48 occurring before a transition in the polarity pulses provided on clock polarity line 46. Shift logic 100 then masks out all data pulses in data shift register 96 occurring within the same polarity period as derived from polarity shift register 98, except for the last data pulse in the sequence. This is done by selectively activating the enable output 106 of shift logic 100 connected to AND gate 102 as pulse data is clocked through data shift register 96 by read clock line 50. This last data pulse represents the first highest peak achieved by the raw data signal input to threshold circuitry 22 within a given polarity cycle for the raw data signal.

The output of AND gate 102 is shown in graph 74 of FIG. 3 showing that only the chronologically last data pulse provided on the encoded pulse data line 34 is transferred through logic 28 to gate sync output 52 within a given polarity zone in the raw data signal.

Gated sync output 52 of data shift register 96 may then be processed through a phase comparator (not shown) and phase lock loop (not shown) to recover the data and the clock signals.

Logic 28 comprising data shift register 96, shift logic 100 and phase shift register 98 introduces a time delay into the circuit. In order to keep the phase lock loop in synchronization, only pulses occurring over the high threshold level (62 and 64 in FIG. 3) are sent to the phase lock loop phase detector. This may result in a number of "dropouts" in relation to the phase lock loop, but such circuits are inherently less susceptible to dropouts than to wrongly located pulses. This problem is improved by using high and low threshold level (58–64) as shown in FIG. 3. Data lines 36 and 38 carry high and low threshold information to phase lock loop (not shown) in separator 24. Only encoded pulse data (shown in graph 68 of FIG. 3) in which both the high and low threshold lines 36 and 38 are in the same state is used by the phase lock loop for phase detector information. This is to eliminate bad phase information caused by the lower peaks that may deliver encoded pulse data on line 34. All pulse data shown graphically in graph 68 of FIG. 3, however, is used by the monotonic peak detection circuitry.

This circuitry improves off track performance especially when used with high density codes such as the 1, 7 code in which a long baseline and low resolution can occur simultaneously. The use of shift registers 96 and 98 allow as much look ahead as is desired depending only upon the capacity of the shift registers. The circuitry can look ahead all the way to the next adjacent polarity peak. This memory feature is a distinct advantage over methods that employ only true pulse to pulse detection. The circuitry, however, must be robust enough to tolerate the delay introduced due to shift registers 96 and 98. For the 1, 7 code, this delay will have a worst case duration 4.66 data bits.

Figure 6:
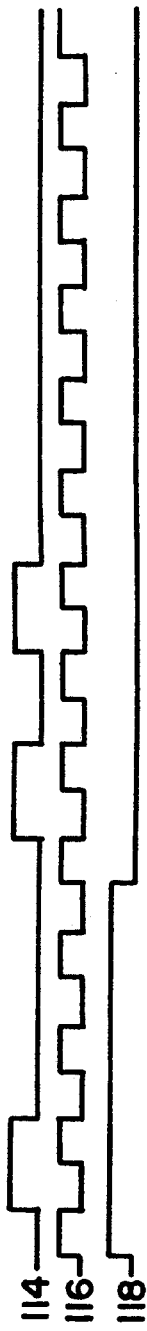
FIG. 6 is a timing diagram for the circuit of FIG. 5.

In FIG. 6, a logic diagram is shown for logic circuit 28 of FIG. 5. The sync pulse signal is shown as graph 114, the clock signal from line 54 is shown as graph 116 and the clocked polarity signal from line 46 is shown as graph 118. The clocked polarity signal 118 always changes state prior to a sync pulse in sync pulse signal 114. Due to circuit design this will always be the case. The rising edge of clock signal 116 will shift both the polarity information and the data into shift registers 96 and 98, respectively. Data shift register 96 contains "1" level logic whenever a flux reversal has been detected. Polarity shift register 98 contains "1" level logic normally and will be a "0" level whenever a polarity change has occurred in the raw data signal. The overall operation of shift registers 96 and 98 and logic 100 is to provide only a data output for the last flux reversal in a given polarity zone in the raw data signal. Any flux reversals of that same polarity occurring earlier in time will be eliminated.

Using shift registers 96 and 98 and shift logic 100, this pulse elimination is accomplished by the following rules:

(1) A "0" in polarity shift register 98 indicates that the polarity of the corresponding data in data shift register 96 has changed polarity.

(2) A "1" in a location of data shift register 96 indicates a flux reversal location. If there is a "0" in the corresponding polarity shift register 98 location, the actual polarity changed prior to that flux reversal occurrence. Therefore, when referring to the data shown in FIG. 7, data shift register 96 locations A1 and A4 are of different polarities, but data locations A4 and A6 are of the same polarity.

(3) When a "1" in data shift register 96 reaches the A6 location, all following "1"s in shift register 96 are compared in shift register 96 with their own polarity location in polarity shift register 98 and those polarity locations up to and including the location of the "1" in data shift register 96. If all of these "1"s see at least a single polarity change (indicated by a 0), than the "1" in the location A0 is sent out as data. If any of the following "1"s in data shift register 86 do not see a proceeding "0", the data in location A0 must be the same polarity as another later "1" and it is eliminated by AND gate 102.

Mathematically this may be shown with the following Boolean equation:

$$\text{Enable} = {}'A_{961} \times A_{981}) + [A_{962} \times (A_{981} \times A_{982})] +$$
$$[A_{963} \times (A_{981} \times A_{982} \times A_{983})] \ldots +$$
$$[A_{966} \times (A_{981} \times A_{982} \times A_{983} \times A_{984} \times A_{985} \times A_{986})]$$

where the $A_{961}$–$A_{966}$ represent data locations 1–6 in data shift register 96 and $A_{981}$–$A_{986}$ represent the locations of data stored in phase shift register 98.

The location of the highest peak during a period of the raw data cycle may be detected using a tri-level qualification scheme. Each peak triggers a set of flip flops whose inputs are tied to a set of comparators, each comparator having a qualification voltage reference level as one input and the raw signal as the other input. The output of these comparators triggers the flip flops. The shape of the raw data signal determines the state of the flip flops such that by detecting the pattern of the settings of the flip flops, logic can determine which trigger was caused by the highest read signal.

This logic introduces a time delay into the circuit. In order to keep the phase lock loop in sync, only pulses occurring over the medium qualification threshold of the three threshold levels are sent to the phase lock loop detector. This may still result in a number of "dropouts" in relation to the phase lock loop, but phase lock loop circuits are inherently less susceptible to dropouts than to wrongly located pulses.

FIG. 8 shows tri-level detection circuitry 120. Circuit 120 includes comparators 122–134 and D flip flop 136–146. Tri-level detection circuitry 120 also includes reset and synchronization logic 148 and encoder logic 150. The raw data signal from an automatic gain control 31 is applied to inputs 152 and 154 which connect to the non-inverting inputs on comparators 122–134. Tri-level threshold voltages $V_{tH}$, $V_{tM}$ and $V_{tL}$ connect to the inverting terminals on comparators 122–134. $V_{tH}$ represents the high level threshold voltage and connects to the inverting terminals of comparators 126 and 134. $V_{tM}$ represents the mid-level threshold voltage and connects to the inverting inputs on comparators 124 and 132. $V_{tL}$ represents the low level threshold voltage and connects to the inverting inputs on comparators 122 and 130. The inputs of comparator 128 receive voltage signals representing the zero crossing of the derivative of the raw data signal provided from the magnetic sensor (not shown). The inverted and non-inverted outputs of comparator 128 provide the clocking signal used by flip flops 136–146. The D inputs of flip flops 136–146 connect to the outputs of comparators 122–134. The Q outputs of flip flops 136–146 connect to reset and synchronization logic 148. Reset inputs for comparators 136–146 are also connected to reset and synchronization logic 148. Reset and synchronization logic 148 provide binary outputs on lines a0–a5 in FIG. 9 to encoder logic 150 which provides encoded binary output on lines b0–b2.

The inputs of zero crossing comparator 128 carry voltage information derived using standard methods of differentiation and zero cross detection such that only positive peaks are re-timed onto positive thresholds and only negative peaks onto negative thresholds. Using this technique, each peak in the raw data signal is detected by sensing the zero crossing in the derivative of the raw data signal.

Figure 9:
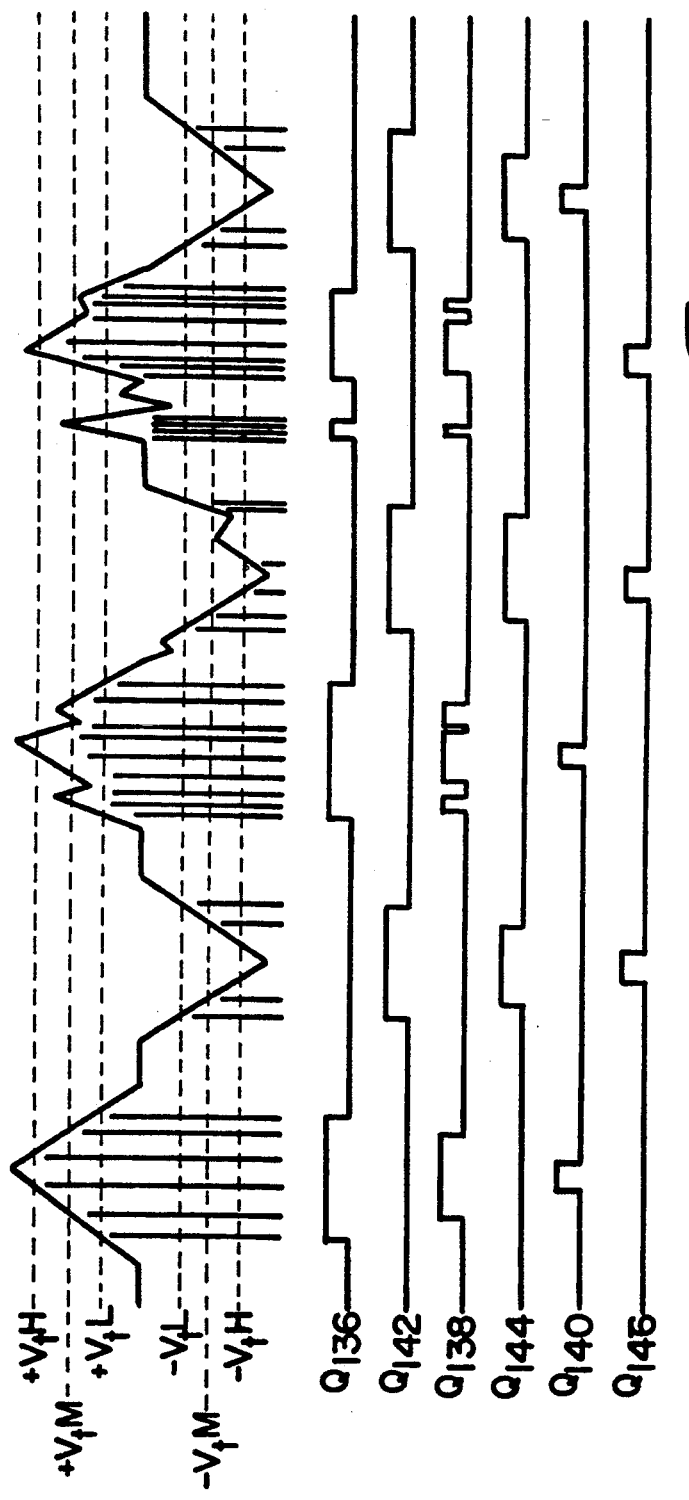
FIG. 9 shows a raw data signal along with a timing diagram for the tri-level qualification circuitry of FIG. 8.

FIG. 9 is a graph of the raw data signal from Automatic Gain Control 31 (see FIG. 2) and the corresponding Q outputs on flip flops 134–146. The raw data signal is labelled $V_{152}$–$V_{154}$ and represents the voltage difference between inputs 152 and 154 shown in FIG. 8. The dashed lines labelled positive and negative $V_{tH}$, $V_{tM}$ and $V_{tL}$ in FIG. 9 represent the three voltage threshold levels used by tri-level qualification circuitry 120. The outputs of flip flops 136–146 are labelled $Q_{136}$–$Q_{146}$. $Q_{136}$, $Q_{138}$, and $Q_{140}$ indicate when the raw data signal has exceeded the low voltage threshold, the medium voltage threshold and the high voltage threshold, respectively. The plots labelled $Q_{142}$, $Q_{144}$, and $Q_{146}$ indicate when the raw data signal taken at $V_{152}$-$V_{154}$ is less than $-V_{tL}$, $-V_{tM}$ and $-V_{tH}$, respectively. The outputs of flip flops 136–146 are connected to reset and synchronization logic 148 which provides a binary representation of each pulse level in the raw data signal provided to inputs 152 and 154. Reset and synchronization logic 148 also resets flip flops 138–144 upon completion of a polarity cycle in the raw data signal.

Encoder logic 150 receives the binary signal on data lines a0–a5 from logic 148 and provides an encoded output on data lines b0–b2. The encoded binary outputs b0–b2 may then be directed to a controller unit such as a microprocessor (not shown) which produces an output representing the peak in the raw data signal exceeding the greatest number of the three threshold levels occurring first within a given polarity cycle in the raw data signal. Comparator 128 used to clock flip flops 136–146 causes only the peaks in the raw data signal to be digitized by comparators 121–126 and 130–134 and latched by flip flops 136–146 because the input of comparator 128 receives a signal related to the derivative of the raw data signal and flip flops 136–146 have edge triggered clock inputs. The circuitry causes only positive peaks to be re-timed onto positive thresholds and only negative peaks to be re-timed onto negative thresholds.

The comparator controlled circuitry of FIG. 8 using tri-level peak detection may be particularly useful because the peak detecting algorithm is implemented in computer software. The detection system may easily be optimized for a given magnetic read-back system by prioritizing the various combinations of peak threshold levels and their occurrence chronologically within a polarity cycle in the raw data signal from the magnetic head. This versatility provides the ability to optimize the qualification criteria on a system by system basis without repeated redesign of the hardware components.

Only those pulses exceeding the medium level voltage threshold are used as inputs for the phase lock loop (not shown). Pulses exceeding the high and low voltage thresholds are synchronized to the phase lock loop but otherwise have no effect upon phase lock loop operation.

The present invention improves accuracy during read back of information from magnetic storage medium such as magnetic disks. The invention is particularly advantageous for use with high density coding schemes used to increase disk storage capacity. These codes tend to have larger band widths and longer baselines making them more susceptible to noise and cross talk, especially if the magnetic read head is slightly off track. The present invention allows for reduced voltage qualification thresholds, particularly useful in detecting low amplitude raw data signals such as those in which the minimum pulse separation is low and the amplitude has been reduced to lower the inter-symbol interference. By detecting the first highest peak after the read signal has passed a minimum qualification threshold, and assigning that peak as the real location of the data pulse, it is possible with the present invention to lower the qualification threshold and still avoid problems associated with dropouts.

Although the present invention has been described with reference to preferred embodiments, workers skilled in the art will recognize that changes may be made in form and detail without departing from the spirit and scope of the invention.

What is claimed:

1. An apparatus for qualifying data peaks in a raw data signal produced by a magnetic transducer in a magnetic data storage system, the raw data signal having a polarity cycle and an amplitude, the apparatus comprising:
   an automatic gain control stage circuit coupled to the magnetic transducer for receiving the raw data signal and for outputting an amplified raw data signal;
   threshold detect means for receiving the amplified raw data signal from the automatic gain control stage circuit, for comparing the amplified raw data signal with a plurality of positive and negative threshold reference voltages, for providing an encoded pulse data output comprising encoded data pulses representative of an occurrence of a monotonically increasing peak within a polarity cycle, for providing a polarity (low) output representative of an occurrence of the amplitude of the amplified raw data signal exceeding a low threshold level, and for providing a polarity (high) output representative of an occurrence of the amplitude of the amplified raw data signal exceeding a high threshold level;
   separator means for receiving the encoded pulse data output, the polarity (high) output, and the polarity (low) output from the threshold detect means, for providing a sync pulse data output representing synced data pulses, and for providing a clock output generated from a phase lock loop circuit wherein the clock output is based upon encoded data pulses which occur when logic states of the polarity (low) output and the polarity out (high) output are the same;
   a flip flop having a D input connected to the polarity (low) output of the threshold detecting means, a clock input connected to the encoded pulse data output of the threshold detecting means, and a Q output for providing a clocked polarity output; and
   logic means for receiving the sync pulse data output, the clock output and the clocked polarity output and for providing a gated sync pulse output representing an occurrence of a last synced data pulse which occurs during a polarity cycle of the raw data signal.

2. The apparatus of claim 1 wherein the logic means comprises:
   a data shift register for receiving synced data pulses from the separator means, for shifting synced data pulses through a plurality of data locations in response to the clock output from the separator means, and for providing a data shift register output comprising shifted synced data pulses;
   a polarity shift register for receiving the clocked polarity output from the flip flop and for shifting the clocked polarity output through a plurality of data locations in response to the clock output from the separator means;
   an output gate for providing the gated sync output, wherein the output gate is connected to the data shift register output and includes an enable input; and
   shift logic means for detecting contents of the plurality of data locations of the data shift register and the plurality of data locations of the polarity shift register and for providing an enable signal to the enable input of the output gate when the data shift register output represents the occurrence of the last synced data pulse during the polarity cycle of the raw data signal.

3. The apparatus of claim 2 wherein the data shift register has a plurality of data locations ($A_{DS}1$, $A_{DS}2$ . . . $A_{DS}N$), the polarity shift register has a plurality of data locations ($A_{PS}1$, $A_{PS}2$ . . . $A_{PS}N$) and the enable signal of the shift logic means is according to the following relationship:

$$Enable = (A_{DS}1 \times A_{PS}1) + [A_{DS}2 \times (A_{PS}1 \times A_{PS}2)] \cdots + [A_{DS}N \times (A_{PS}1 \times A_{PS}2 \cdots \times A_{PS}N)].$$

4. The method of qualifying data peaks in a raw data signal having an amplitude and a polarity cycle produced by a magnetic transducer, comprising:
   amplifying the raw data signal and providing an amplified data signal;
   comparing the amplified data signal with a plurality of positive and negative threshold reference levels;
   outputting an encoded pulse data output comprising encoded data pulses representative of an occurrence of a monotonically increasing peak within a polarity cycle;

outputting a polarity out (low) output representative of an occurrence of the amplitude of the amplified raw data signal exceeding a low threshold level;

outputting a polarity out (high) output representative of an occurrence of the amplitude of the amplified raw data signal exceeding a high threshold level;

receiving the encoded pulse data output, the polarity (high) output, and the polarity (low) output and outputting a sync pulse data output representing synced data pulses;

outputting a clock output based upon encoded data pulses which occur when logic states of the polarity (low) output and the polarity (high) output are the same;

providing a clocked polarity output representative of the polarity cycle of the raw data signal based on the polarity (low) output and the encoded pulse data output; and receiving the sync pulse data output, the clock output and the clocked polarity output, and providing a gated sync pulse output representing an occurrence of a last synced data pulse which occurs during a polarity cycle of the raw data signal.

5. The method of claim 4 wherein providing a gated sync pulse output comprises:

shifting synced data pulses through a plurality of data locations in a data shift register in response to the clock output and providing a data shift register output comprising shifted synced data pulses;

shifting the clocked polarity output through a plurality of data locations in a polarity shift register in response to the clock output; and detecting contents of the plurality of data locations of the data shift register and the plurality of data locations of the polarity shift register and providing an enable signal to an enable input of an output gate when the data shift register output represents the occurrence of the last synced data pulse during the polarity cycle of the raw data signal.

6. The method of claim 5 wherein the data shift register has a plurality of data locations ($A_{DS}1$, $A_{DS}2$ ... $A_{DS}N$), the polarity shift register has a plurality of data locations ($A_{PS}1$, $A_{PS}2$ ... $A_{PS}N$) and the step of providing an enable signal comprises providing an enable signal based upon the following relationship:

$$Enable = (A_{DS}1 \times A_{PS}1) + [A_{DS}2 \times (A_{PS}1 \times A_{PS}2)] \ldots + [A_{DS}N \times (A_{PS}1 \times A_{PS}2 \ldots \times A_{PS}N)].$$

7. A method of encoding data peaks in a raw data signal having an amplitude and a polarity cycle produced by a magnetic transducer, comprising:

comparing the amplitude of the raw data signal to a plurality of positive and negative qualification threshold levels and producing comparator outputs representing the amplitude compared to each of the plurality positive and negative qualification levels;

calculating a first derivative of the raw data signal;

providing a clocking signal based upon detection of a zero crossing in the first derivative of the raw data signal representing a peak in the raw data signal;

latching the comparator outputs with a plurality of data latches clocked to the first derivative of the raw data signal and providing latched data outputs, whereby the comparator outputs are latched in response to the clocking signal based upon a peak in the raw data signal;

synchronizing the latched data output and providing synchronized data outputs;

resetting the plurality of data latches in response to the polarity cycle of the raw data signal; and encoding the synchronized data outputs and providing an encoded binary output representative of peaks in the raw data signal based upon the comparison of the amplitude of the raw data signal to the plurality of positive and negative threshold levels.

8. The method of claim 7 wherein the plurality of positive and negative threshold levels comprises three positive threshold levels and three negative threshold levels.

9. An apparatus for encoding data peaks in a raw data signal having an amplitude and a polarity cycle produced by a magnetic sensor in a magnetic storage system, the apparatus comprising:

a plurality of positive comparators, each connected to a different voltage threshold level and electrically coupled to the magnetic transducer for comparing the amplitude of the raw data signal to a plurality of voltage threshold levels and providing positive comparator outputs representing an occurrence of the amplitude of the raw data signal exceeding any of the plurality of voltage threshold levels;

a plurality of negative comparators, each connected to a different voltage threshold level and electrically coupled to the magnetic transducer for comparing the amplitude of the raw data signal to a plurality of voltage threshold levels and providing negative comparator outputs representing an occurrence of the amplitude of the raw data signal exceeding any of the plurality of voltage threshold levels;

a clock source comparator for providing noninverted and inverted clock outputs based upon a zero crossing in a first derivative of the raw data signal;

a plurality of positive data latches for latching the positive comparator outputs in response to the inverted clock output of the clock source comparator and providing latched data outputs;

a plurality of negative data latches for latching the negative comparator outputs in response to the noninverted clock output of the clock source comparator and providing latched data outputs; and means for synchronizing to a system clock the latched data outputs from the plurality of positive data latches and the plurality of negative data latches, for providing synchronized data outputs, and for resetting the plurality of positive data latches and the plurality of negative data latches in response to detection of the polarity cycle of the raw data signal.

10. The apparatus of claim 9 including a data encoder coupled to the means for synchronizing, wherein the data encoder encodes the synchronized data outputs into encoded binary data.

* * * * *

UNITED STATES PATENT AND TRADEMARK OFFICE
CERTIFICATE OF CORRECTION

PATENT NO. : 5,105,316
DATED      : April 14, 1992
INVENTOR(S) : ROBERT D. CRONCH, LARRY J. KOUDELE It is certified that error appears in the above-identified patent and that said Letters Patent is hereby corrected as shown below:

Col. 10, line 11, after "polarity", delete "out".

Col. 10, line 57, delete "enable", insert "$\overline{\text{Enable}}$".

Col. 11, line 3, after "polarity", delete "out".

Col. 11, line 6, after "polarity", delete "out".

Col. 11, line 50, delete "Enable", insert "$\overline{\text{Enable}}$".

Signed and Sealed this

Eighth Day of June, 1993

Attest:

MICHAEL K. KIRK

Attesting Officer

Acting Commissioner of Patents and Trademarks